United States Patent [19]

Hetzel et al.

[11] 4,143,072

[45] Mar. 6, 1979

[54] PROCESS FOR THE PURIFICATION OF POLYETHERS USING A TUBULAR COIL EVAPORATOR

[75] Inventors: Hartmut Hetzel, Cologne; Pramod Gupta, Bedburg; Hans-Joachim Sandhagen, Dormagen, all of Fed. Rep. of Germany

[73] Assignee: Bayer Aktiengesellschaft, Leverkusen, Fed. Rep. of Germany

[21] Appl. No.: 900,539

[22] Filed: Apr. 27, 1978

[30] Foreign Application Priority Data

Dec. 10, 1977 [DE] Fed. Rep. of Germany ....... 2755089

[51] Int. Cl.² .............................................. C08G 65/30
[52] U.S. Cl. .................................... 260/573; 528/417; 528/419; 528/421; 260/584 B; 536/120; 568/607; 568/608; 568/609; 568/613; 568/618; 568/620

[58] Field of Search ................ 260/615 B, 573, 584 B, 260/613 B; 528/421, 500, 417, 419; 536/120

[56] References Cited

U.S. PATENT DOCUMENTS

| | | | |
|---|---|---|---|
| 3,326,985 | 6/1967 | Mason | 260/615 |
| 3,341,599 | 9/1967 | Bormann et al. | 260/584 |
| 3,358,042 | 12/1967 | Dunlop et al. | 260/615 |

Primary Examiner—Harold D. Anderson
Assistant Examiner—E. A. Nielsen
Attorney, Agent, or Firm—Gene Harsh; Joseph C. Gil

[57] ABSTRACT

This invention relates to a process for the removal of troublesome secondary products, particularly small quantities of water, solvents, low molecular weight glycols, and pungent-smelling substances, from polyethers by means of a tubular coil evaporator.

7 Claims, 1 Drawing Figure

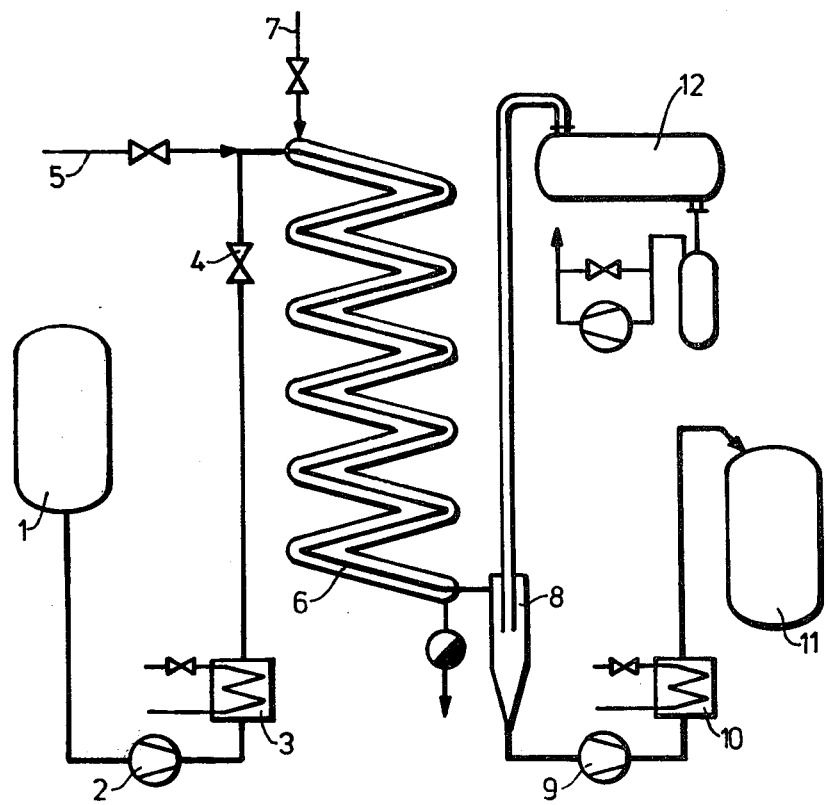

PROCESS FOR THE PURIFICATION OF POLYETHERS USING A TUBULAR COIL EVAPORATOR

BACKGROUND OF THE INVENTION

In the commercial production of polyethers by the alkoxylation of suitable starter compounds containing active hydrogen atoms, the resulting crude product contains from about 0.1 to 2%, by weight, of residual water, from about 0 to 2% of solvent (generally an aromatic solvent, such as xylene or toluene) and odorous substances (largely propionaldehyde, propionic acid, dioxolanes and allyl ethers). This crude product is obtained after neutralization of the reaction mixture, preliminary dehydration and subsequent filtration of inorganic salts. Although the odorous substances are generally present in quantities of only up to 1%, by weight, they nevertheless impart intensively aromatic odor to the polyethers. In conventional processes, the odorous substances may largely be removed by treating the crude polyether in a stripping column. The crude polyether may then be freed from residual water and residual solvent in a thin film evaporator. For economic reasons, the crude polyether is generally subjected to only a single working-up stage in the thin film evaporator (i.e. without pretreatment in a stripping column). Unfortunately, it is extremely difficult to remove all the solvent residues in this way and the odorous substances are only removed to a minimal extent. Another disadvantage of the thin film evaporator is its considerable cost and outlay and also the difficulty of sealing off the rotating parts. In addition, thin film evaporators have to be operated at very low pressure (generally from 1 to 10 mbars), which necessitates an elaborate vacuum-generating system and complicates condensation of the volatile fractions. If, however, the thin film evaporators are operated under pressures above 10 mbars, the operating temperature has to be selected so high that even minor leaks in the system result in damage to the polyether by oxidation.

In principle, falling film evaporators may also be used for working-up crude polyethers. Unfortunately, they are attended by substantially the same disadvantages as thin film evaporators for the application in question. In addition, problems are involved in uniformly distributing the crude polyether over the evaporation surface.

DESCRIPTION OF THE INVENTION

It has now surprisingly been found that crude polyethers may be substantially freed from water, solvent residues and other readily volatile impurities and, at the same time, largely deodorized in a single operation by a process in which they are passed, in the presence of steam, through a uniformly coiled, heated tube. This process is also eminently suitable for the removal of low molecular weight glycols and volatile amines from mixtures of these substances with polyethers.

Another preferred use of the process according to the invention is the removal of toxicologically undesirable traces of monomers such as styrene and acrylonitrile from polyethers which have been modified by an in situ polymerization or copolymerization of olefinically unsaturated compounds. An extremely low content of residual monomers in the polyether polyol may be attained in this way by means of a very simple processing step.

One particular advantage of the process according to the present invention lies in the high throughput which may be obtained, despite minimal outlay in apparatus. It is also possible to work at much higher pressures than is the case with thin layer evaporators. This saves energy costs and facilitates condensation of the volatile impurities which in turn results in less pollution of the environment by waste gases.

Accordingly, the present invention relates to a process for the purification of crude polyethers which comprises introducing a crude polyether into a heated tubular coil evaporator along with from 1 to 20%, by weight, preferably from 2 to 8%, by weight, and, with particular preference, from 2.5 to 5%, by weight, of steam. A pressure of from 5 to 200 mbars, preferably from 20 to 80 mbars, is applied to the end of the tubular coil evaporator. At the same time, the heating of the tubular coil evaporator is controlled in such a way that the temperature of the polyether in the evaporator is from 100° to 220° C., preferably from 130° to 170° C. The rate of flow of the vapor mixture, based on the cross-sectional area of the tube through which it flows is spontaneously adjusted to between 40 meters/sec. and the speed of sound preferably between 100 meters/sec and 300 meters/sec. The pure polyether is separated off with a cyclone from the vapor phase. The vapor phase contains the added steam and the volatile impurities.

Tubular coil evaporators are known to be suitable apparatus for concentrating solutions of a solid by evaporation and for removing readily volatile constituents from mixtures of substances (CIT 42, 1970, pages 349–354; U.S. Pat. Nos. 3,550,669 and 3,834,441. They comprise a coiled, descending tube which is heatable in sections and into which the liquid starting products are introduced from above. A two-phase flow is produced on entry into the tubular coil evaporator. The gas phase being formed by flash evaporation after a construction. By virtue of the high rate of flow of the gas phase, a turbulent, thin-layer ring flow of the product mixture is produced in the uniformly coiled tube under the action of centrifugal forces. The liquid flows along the wall and the gas through the interior of the tube. Under the effect of the additional circular flow, directed perpendicular to the ring flow between tube wall and liquid surface, intensive heat exchange takes place between the heated tube wall, the liquid and the gas. This is accompanied by an intensive exchange of material between the liquid phase and the gas phase. Gas flow rates up to just below the speed of sound may occur at the outlet end of the tubular coil evaporator.

In conventional processes for the removal of readily volatile constituents by means of a tubular coil evaporator, the product mixtures have to contain a relatively large amount of volatile constituents to produce the gas stream essential to the process. This requirement is no longer fulfilled in the case of the crude polyethers used in the process according to the present invention because the volatile fractions are only present in low concentrations. However, it has surprisingly been found that, according to the present invention, all troublesome impurities may be removed from the crude polyethers to a very considerable extent by using steam as an entraining agent.

Both monofunctional and polyfunctional hydroxy polyethers may be purified by the process of the present invention. It is known that polyethers may be obtained by polymerizing epoxides, such as ethylene oxide, propylene oxide, butylene oxide, tetrahydrofuran, styrene oxide or epichlorhydrin on their own, for example in the presence of Lewis acids (for example boron trifluoride). They may also be obtained by adding epoxides, optionally in admixture or successively, with starting components containing reactive hydrogen atoms in the presence of acids or preferably strong bases as catalysts. Starters of the type in question include: n-butanol, n-hexanol, phenol, water, ethylene glycol, 1,2- and 1,3-propylene glycol, 1,4-butane diol, 4,4'-dihydroxydiphenyl propane, glycerol, trimethylol propane, erythritol, sorbitol, ammonia, ethylene diamine, aniline, ethanolamine and triethanolamine. Sucrose polyethers of the type described, for example, in German Auslegeschriften 1,176,358 and 1,064,938, and polyethers modified by vinyl polymers of the type obtained, for example, by polymerizing styrene and acrylonitrile in the presence of polyethers (U.S. Pat. Nos. 3,383,351; 3,304,273; 3,523,093 and 3,110,605; German Pat. No. 1,152,536) may also be freed from impurities by the process according to the present invention. Preferred polyethers are polyethers based on ethylene oxide and/or propylene oxide containing from 1 to 5, preferably 2 or 3, hydroxyl groups and have molecular weights from 750 to 15,000, preferably from 1000 to 12,000, and, with particular preference, from 2000 to 6000. Their viscosity at 100° C. is generally from 10 to 800 cP, preferably from 50 to 200 cP.

As mentioned above, the crude polyethers are obtained after preliminary dehydration and desalting of the technical process products. They have a residual water content of from 0.1 to 2%, by weight, preferably from 0.4 to 1.2%, by weight, and a solvent content (generally an aromatic solvent, such as xylene or toluene) of from 0 to 2%, by weight, preferably from 0.5 to 1.5%, by weight. They are then subjected to the purification process according to the present invention. In addition, the polyethers may generally contain from 0.1 to 0.5%, by weight, of low molecular weight glycols and traces (generally less than 0.1%) of propionaldehyde, propionic acid, dioxolanes, allyl ethers and other highly odorous secondary products.

By virtue of the purification process according to the present invention, it is possible to obtain products with a high degree of purity in which the water content, for example, is less than 0.03% by weight, the solvent content less than 0.01% by weight, and the glycol content below the detection limit. (These residual concentrations may be further reduced when required by a second purification step). The present process is also distinguished by the fact that highly odorous substances may readily be removed to a considerable extent.

An installation suitable for carrying out the process according to the present invention is diagrammatically illustrated in FIG. 1:
- 1 = receiver for the polyether
- 2 = variable-drive gear pump
- 3 = heat exchanger for product heating
- 4 = throttle valve
- 5 = inlet for the entraining steam
- 6 = tubular coil evaporator with a heatable jacket
- 7 = inlet for heating steam into the jacket of the tubular coil evaporator
- 8 = vapor separator (cyclone)
- 9 = discharge pump
- 10 = product cooler
- 11 = collecting vessel for the purified polyether
- 12 = vapor condenser with vacuum receiver and water ring pump.

When the installation is started up, the tubular coil evaporator (6) and the vapor separator (8) are evacuated to the working pressure (from 5 to 200, preferably from 20 to 80 mbars) via the vapor condenser and the vacuum receiver using the water ring pump (12). The entraining steam (5) is then introduced into the tubular coil evaporator in a quantity of from 1 to 20%, by weight, preferably from 2 to 8%, by weight, and with particular preference, from 2.5 to 5%, by weight, based on the product throughput envisaged. The tube is then heated with steam (7) by means of the heatable jacket to the working temperature of from 100° to 220° C., preferably from 130° to 170° C. The installation is now ready for operation and the crude polyether may be introduced into the tubular coil evaporator. The purified polyether and the vapor phase are separated in the cyclone (8). The vapor is condensed in the condenser (12) and the purified product is discharged by the pump (9). The average residence time of the polyether in the tubular coil is generally less than 2 minutes, preferably from 10 to 50 seconds.

According to the present invention, it is preferred to use tubular coil evaporators having an internal tube diameter of from 25 to 150 mm and, with particular preference, from 40 to 100 mm; a ratio of internal tube diameter; tube length of from 1:100 to 1:2000 and, with particular preference, from 1:200 to 1:1000; and a ratio of internal tube diameter:coil diameter of from 1:5 to 1:100 and, with particular preference, from 1:10 to 1:40.

The flow tube used in the following Examples had a length of 45 meters, an internal tube diameter of 40 mm and a diameter of curvature of the coils of 80 cm.

The quantities quoted in the Examples represent percent, by weight, unless otherwise indicated.

EXAMPLES

EXAMPLE 1

Purification of a Crude Polyether

In this Example, a trimethylol propane-started polyether of 90% of propylene oxide and 10% of ethylene oxide (molecular weight 3200) was purified, both by the process of the present invention and, for comparison, by the conventional means of a thin film evaporator. Before introduction into the tubular coil evaporator and the thin film evaporator, the crude polyether contained 0.8% of water and 0.2% of toluene as its principle impurities.

The temperature in the tubular coil evaporator was 153° C. and the pressure 86 mbars. 1600 kg/hour of the crude polyether and 60 kg/hour of steam were introduced. Gas chromatographic analysis of the polyether after purification in accordance with the present invention and after conventional purification (thin layer evaporator) produced the following results:

|  | Product after purification in accordance with the present invention in % | Product after conventional purification in the thin film evaporator % |
|---|---|---|
| Water | 0.03 | 0.03 |
| Toluene | <0.01 | 0.02 |
| Propylene glycol | <0.1 | <0.1 |
| Unknown 1 | <0.1 | 0.3 |
| Dipropylene glycol | <0.1 | <0.1 |
| Unknown 2 | 1.6 | 1.9 |

|  | Product after purification in accordance with the present invention in % | Product after conventional purification in the thin film evaporator % |
|---|---|---|
| Unknown 3 | <0.1 | <0.1 |
| Unknown 4 | 0.2 | 0.4 |
| Tripropylene glycol | <0.1 | <0.1 |
| Unknown 5 | 0.2 | <0.1 |
| Unknown 6 | 0.2 | 0.2 |
| Unknown 7 | 0.4 | 0.6 |

In contrast to the crude polyether, the polyether purified in accordance with the present invention (OH-number 49) was substantially odorless. The intensity of odor which it was still possible to discern was distinctly below the level obtained by treatment in the thin layer evaporator. The purified polyether is eminently suitable for use as a starting component in the production of polyurethane foams.

EXAMPLE 2

Removal of Glycol and Hydrazine Impurities 90 tons of a hexafunctional polyether of propylene oxide and ethylene oxide (OH-number 28) had become contaminated with heating liquid (ethylene glycol, water and traces of hydrazine) as a result of a defect in the heating system of the production plant. It was not possible to remove the impurities from the polyether by conventional kettle or thin-film evaporation.

The impure polyether (1500 kg/h) was passed through the tubular coil evaporator with entraining steam (45 kg/h) at a temperature of 170° C. and under a pressure of 100 mbars.

The ethylene glycol and the hydrazine were substantially removed by the purification process according to the present invention.

|  | Before contamination with heating liquid | After contamination with heating liquid | After treatment in the coil evaporator |
|---|---|---|---|
| OH-number (mg/KOH/g) | 28.3 | 32.5 | 28.5 |
| Water content (%) | 0.04 | 1.15 | 0.03 |
| Base content (ppm KOH) | 7.3 | 11.5 | 8.7 |
| Ethylene glycol content (%) | — | 0.79 | 0.1 |

The thus-purified polyether could be used without difficulty for the production of polyurethane foams.

What is claimed is:

1. A process for the purification of crude polyethers, comprising introducing crude polyether into a heated tubular coil evaporator together with from 1 to 20%, by weight, of steam, a pressure of from 5 to 200 mbars being applied to the end of the tubular coil evaporator and, at the same time, the heating of the tubular coil evaporator being regulated in such a way that the polyether temperature in the evaporator is from 100° to 220° C., the rate of flow of the vapor mixture, based on the cross-sectional area of the tube through which it flows, being between 40 m/s and the speed of sound; separating the pure polyether from the vapor phase which contains the added steam and the volatile impurities; and recovering the purified polyether.

2. The process of claim 1 wherein from 2 to 8% by weight of steam is used.

3. The process of claim 1 wherein from 2.5 to 5% by weight of steam is used.

4. The process of claim 1 wherein said pressure applied to the end of the evaporator is 20–80 mbars.

5. The process of claim 1 wherein the polyether temperature is from 130° to 170° C.

6. The process of claim 1 wherein the polyethers used are based on ethylene oxide and/or propylene oxide and contain from 1 to 5 hydroxyl groups, have a molecular weight of from 750 to 15,000 and have a viscosity at 100° C. of from 10 to 800cP.

7. The process of claim 6 wherein the polyether contains from 2 to 3 hydroxyl groups, has a molecular weight of from 2000 to 6000 and has a viscosity at 100° C. of from 50 to 200 cP.

* * * * *